United States Patent Office 2,815,328
Patented Dec. 3, 1957

2,815,328

CORROSION INHIBITOR COMPOSITION FOR AQUEOUS LIQUIDS

Jerome Green and David B. Boies, Chicago, Ill., assignors to National Aluminate Corporation, Chicago, Ill., a corporation of Delaware No Drawing. Application February 25, 1955, Serial No. 490,694

9 Claims. (Cl. 252—75)

This invention relates to corrosion inhibitors, non-corrosive liquids and methods for inhibiting corrosion. More particularly, the invention relates to compositions and methods for the prevention of corrosion in heat exchange devices employing aqueous solutions, and it finds important application in the prevention of corrosion in diesel engine cooling systems.

This application is a continuation-in-part of our co-pending application, Serial No. 375,837, filed August 21, 1853, now abandoned, and the disclosure of the latter application is incorporated herein and made a part hereof by reference as fully as if it were set forth herein in its entirety.

When the diesel electric locomotives were first introduced, very little consideration was given to the water treatment with the result that severe deterioration of the cooling systems occurred in a period as short as a few months. Major overhauls were required after a period of only eighteen months. Failures occurred in engine frames due to stress corrosion, radiators became plugged with corrosion products, and erosion corrosion caused rapid penetration of liners with a resultant leakage of cooling water into the crankcase.

These conditions rapidly brought the seriousness of the problem to the fore, with the result that numerous solutions to the problem and treatments of all types were used for a time. With continued service experience, only the chromate base inhibitors were found generally satisfactory, and acceptance of this type of inhibitor grew. However, even with the general adoption of chromates, all problems were not solved.

Some types of equipment were subject to severe cavitation erosion attack, so that dosages of inhibitors effective for most applications were not effective for controlling this type of attack. With continued development, it was found that satisfactory life and performance of these parts could be obtained by increasing the chromate concentration in the cooling water and maintaining the pH in the range of from 9.0 to 9.5. In some cases aluminum used in oil coolers and radiator headers was severely attacked. A sodium chromate-sodium nitrate combination was developed which gave good results in protecting aluminum even when coupled with brass. The pH of this treatment was maintained in the pH range of 7.5 to 8.0.

However, chromate inhibitors, while finding extensive use, suffer from a number of disadvantages. Although cavitation and erosion attack has been controlled, as indicated above, and aluminum attack has been reduced, the optimum conditions for each type of attack are different. Consequently, a blend of the treatment conditions is employed, with the result that aluminum corrosion continues, although considerably reduced.

Chromates are also not recommended for use with antifreeze materials, particularly ethylene glycols. The chromates have apparently caused deleterious effects on some lubricating oils where water contamination has occurred.

One problem that has not been brought under proper control up to the present is the problem of complaints the railroads receive of dermatitis by workers handling or coming in contact with chromate inhibitors or solutions, or parts that were in contact with the chromate inhibitors. There is an urgent need of a non-hazardous, non-dermatitis producing diesel cooling system treatment.

Another important factor is that chromates are in short supply in periods of national emergency, so that their availability for use in corrosion inhibition applications cannot always be assured.

The problem of adequate corrosion protection of a diesel cooling system is complex. There are areas of high and low velocities. Narrow interstices are numerous. Several different metals are used of widely different behavior. For example, the metals used in one system which are in contact with the cooling water are the following:

(1) Galvanized steel plate
(2) Bronze
(3) Copper
(4) Cast iron
(5) Stainless steel
(6) Steel
(7) Aluminum
(8) Tin
(9) Lead
(10) Silver Non-metal components are:
(1) Carbon
(2) Synthetic rubber (silicone)
(3) Neoprene
(4) Asbestos gaskets An ideal corrosion inhibitor for a diesel cooling system in addition to protecting the many metals and non-metal parts should pass the following requirements:

(1) Should be non-scale forming.
(2) should not form sludge.
(3) Should not induce foaming in the recirculating cooling water.
(4) Should be compatible with antifreeze compounds and effect good corrosion protection in their presence.
(5) Should be chemically stable so that continued use in a system under operating conditions will not cause deterioration and a consequent decrease in effectiveness.
(6) Should not cause harmful effects when mixed with lubricating oils, since in some cases leakage of cooling water through seals into the crankcase can occur.
(7) Should be non-hazardous to personnel
(8) Should be economical to use.
(9) As nearly as possible, the dosage should not be critical, so that it will function with a variety of service conditions of water hardness, dissolved solids, temperature, velocity, pH value and other variables encountered.

(10) Should lend itself to simple analysis for ease of control.

(11) Should not build up objectionable deposits in exhaust ports in cases where leakage of the cooling water might occur.

(12) Solubility characteristics should be such that no problems are encountered in making up solutions of desirable concentration either in solution vats or in the cooling system itself.

The chromate treatments have not been entirely satisfactory in all these regards.

It is therefore an object of this invention to provide corrosion inhibiting compositions and methods which overcome the prior disadvantages.

It is a particular object to overcome the disadvantages accompanying the use of chromate inhibitors.

An important object is to provide compositions and methods especially advantageous for the inhibition of corrosion of aluminum, while preventing corrosion of other metals normally encountered.

Another object is to provide compositions and methods useful in preventing corrosion due to aqueous antifreeze solutions.

An additional object is to provide compositions which produce no deleterious effects on lubricating oils and on radiator hose and the like.

A further object is to provide compositions and methods which avoid the industrial hazards previously encountered in connection with the use of inhibitor compositions.

Further objects include the provision of compositions and methods which provide the above-listed desired results. These and other objects and advantages of the invention will be apparent from the following description.

In accordance with the invention, there is now provided a corrosion inhibitor composition comprising a compound selected from the group consisting of mercaptobenzothiazole and alkali metal salts thereof, an alkali metal silicate, an alkali metal nitrite, an alkali metal nitrate, and a compound selected from the group consisting of the boric acids and alkali metal salts thereof.

The new composition is adapted to provide in an aqueous solution thereof an alkali metal salt of mercaptobenzothiazole, an alkali metal silicate, an alkali metal nitrite, an alkali metal nitrate, and an alkali metal borate. The composition when added to water or an aqueous antifreeze solution in turn provides an anti-corrosion solution which is very effective for inhibiting corrosion of metals caused by contact with such a liquid, particularly in heat exchange devices, and it finds especially advantageous application in the cooling system of a diesel electric locomotive.

There is also provided by the invention a method of inhibiting corrosion of metal due to contact with aqueous liquid which involves contacting the metal with the liquid in the presence of an alkali metal salt of mercaptobenzothiazole, an alkali metal silicate, an alkali metal nitrite, an alkali metal nitrate, and an alkali metal borate. A further method of inhibiting corrosion involves incorporating the foregoing compounds in an aqueous heat transfer liquid which is supplied to a heat exchange device or the like.

The compounds are incorporated in the liquid by mixing in solution vats or in the cooling system. The inhibitor composition is preferably supplied as a powdered mixture, although it may be supplied in aqueous solution, and the composition is advantageously supplied in unit dosage form, in pellets, for example, to insure accurate and reliable addition and control and to minimize handling problems.

In the new compositions and methods, a relatively small amount of an alkali metal salt of mercaptobenzothiazole is employed. While a salt of mercaptobenzothiazole may be incorporated in the composition intended for subsequent addition to an aqueous liquid, the acid form is preferably employed. In the alkaline solution resulting, the compound is present as an alkali metal salt.

In the description following and in the claims, the proportions set forth are given with reference to a particular compound of each class described. When another compound of the class is to be employed instead of that compound, an equivalent proportion of the other compound is calculated by determining the amount of the latter required to give the same concentration of the anion, since the activity of the composition is due to the anion content. Where the anion may take several forms, as in the silicates and borates, the anion concentration is calculated on the basis of the content of the parent oxide, i. e., $SiO_2$ and $B_2O_3$, respectively.

Mercaptobenzothiazole is preferably present in the composition designed for addition to liquid in an amount equivalent to at least about 2% by weight of the ingredients employed in accordance with the invention. Preferably, at least 5% is provided. The preferred range of concentration is about 2–15% and about 5–8% appears to be optimum.

It has been found that an amount of mercaptobenzothiazole in the lower portion of the range can be employed most advantageously when there is also present a relatively small amount of an alkali metal salt of a base compound derived from processing petroleum oil fractions, which contains a mixture of organic acids having an average molecular weight of about 300–350, has a low degree of unsaturation, and is surface active (see Ind. and Eng. Chem., vol. 26, No. 2, pages 204–207, February 1934). Such a base compound is Alox 425 (Alox Corporation), which is a mixture of organic acids having an average molecular weight of 310–340, includes hydroxy- and keto-acids, and contains about 25% of oil-insoluble acids. The following are other significant properties of this mixture:

| | |
|---|---|
| Acid number | 75–110. |
| Saponification number | 150–210. |
| Unsaponifiables | 20–30% by weight. |
| Ash | 0.2% maximum. |
| Specific gravity at 158° F. | 0.99–1.00. |
| Weight per gallon | 8.0–8.3 lbs. |
| Melting point | Liquid at room temp. |
| Flash (O. C.) | 245° F. (min.). |
| Fire | 280° F. (min.). |

While a salt of the base compound may be incorporated in the composition intended for subsequent addition to liquid, the acid form is preferably employed. In the alkaline solution resulting, the compound is present as an alkali metal salt.

The base compound is preferably employed in an amount equivalent to about 0.5–10% by weight, preferably 3–5%. A very effective composition is obtained when about 3% Alox 425 is used with about 2.5% mercaptobenzothiazole. Also, even a relatively small amount of Alox 425, about 0.5%, may prove beneficial in the compositions.

An alkali metal silicate is provided in the composition in a relatively small amount equivalent to at least about 4% by weight of sodium metasilicate pentahydrate and preferably at least 6%. A concentration within the range of about 4–15% is preferred, and about 6–10% is further preferred. Water soluble alkali metal silicates other than sodium metasilicate can be employed to provide the equivalent amounts of soluble silica.

An alkali metal nitrite is provided in an amount equivalent to at least about 4% by weight of sodium nitrite, preferably at least 5%. The concentration may range from about 4% to about 40%, with about 5–25% being preferred.

An alkali metal nitrate is provided in an amount equivalent to at least about 4% by weight of sodium nitrate, preferably at least 5%. The concentration may range from about 4% to about 40%, with about 5–25% being preferred. Also, the best results appear to be obtained when the nitrate:nitrite ratio is at least about 1, i. e., 1:1 or greater, calculated as the sodium salts. It appears that good protection is achieved over a wider range of concentrations of the composition in the liquid being treated, when the nitrite and nitrate contents of the composition are relatively high, e. g., about 20% of each.

A relatively large amount of an alkali metal borate is preferably employed. Preferably, sodium tetraborate is provided in the composition, either in the form of the pentahydrate or the decahydrate. Alternatively, the equivalent borate may be provided by the use of a combination of boric acid and an alkali metal metaborate or an inorganic base such as an alkali metal hydroxide, carbonate or bicarbonate. A combination of alkali metal tetraborate and alkali metal metaborate is very useful. Thus, one of the several borates, boric acids and mixtures thereof may be used to furnish the desired borate composition in solution.

The composition is also provided with a sufficient amount of basic reacting material to convert the other acid reacting materials to their alkali metal salts in aqueous medium. Thus, mercaptobenzothiazole and organic acids are converted to salts. For this purpose, the borate content may be adjusted. The desired alkalinity also may be furnished by the basic reacting salts employed. An additional inorganic base may be added, such as an alkali metal hydroxide, carbonate, or bicarbonate.

The combinations and proportions of the basic reacting materials may be varied and are preferably so selected that a pH of about 8.5–10 obtains in aqueous solution. With the remaining ingredients present as salts, a relatively high percentage of alkali metal borate having a molar ratio $M_2O:B_2O_3$, wherein M represents an alkali metal, of about 1:2 assures a pH within the range. Higher ratios can be employed and still maintain the pH below 10. The borate serves the dual purpose of providing a buffer and contributing to the inhibition of corrosion.

The borate is provided in an amount equivalent to at least about 10% by weight of sodium tetraborate pentahydrate, and as high as about 85%. A relatively large amount of about 20–70% is preferred, with 40–70% being further preferred.

An additional ingredient which may be employed in the composition and which provides a composition furnishing very good protection to aluminum and cast iron is an alkali metal alginate. When employed, this ingredient is present in an amount equivalent to about 1–10% by weight of sodium alginate, preferably about 4–6%.

Although the sodium salts of the compounds employed in the invention are preferred because of their lesser cost, potassium and lithium salts may be employed. Ammonium salts, however, are not suitable when the composition is used in a system in which the aqueous medium contacts copper or copper alloys because of the corrosive action of ammonium salts on such alloys under alkaline conditions.

It is to be understood that the inhibitory activity resides in the anions present and that the preference for alkali metal salts, and sodium salts in particular, is based primarily on considerations of cost and solubility. Alkaline earth metal salts are generally insufficiently soluble or react in solution with other components of the composition or water to form insoluble compounds.

To preclude foaming, which may otherwise be encountered, a minor, effective amount of an antifoam may also be included in the composition. Ordinarily, only a fractional percent need by employed. A preferred antifoam is described in British application No. 22,771/47, August 15, 1947, and comprises an intimate mixture of an inorganic aerogel and a methyl siloxane polymer having perceptible rubbery characteristics and containing an average of from 1.75 to 2 carbon atoms per atom of silicon. Such a composition is commercially available under the name Dow-Corning Antifoam A, and it is effective in an amount less than about 0.1% by weight, ordinarily at about 0.03%.

A dye may be included in the composition, to render the aqueous liquid to which the composition is added more easily visible in the sight glass of a cooling system.

The new composition for addition to an aqueous liquid, to produce an anti-corrosion solution, thus includes minor, effective amounts of an alkali metal salt of mercaptobenzothiazole or an equivalent combination of the free acid and a basic reacting material, or a mixture of salt, acid and base, an alkali metal silicate, an alkali metal nitrite, and an alkali metal nitrate. An effective amount of an alkali metal borate is also included, or an equivalent combination of a boric acid and a basic reacting material, or a mixture of salt, acid and base. Preferably, the borate and, if desired, an additional basic reacting material are so selected and are provided in proportions such that a pH of about 8.5–10 obtains in the ultimate solution.

A minor, effective amount of an alkali metal salt of a base compound derived from petroleum oil fractions, of the class described, or an equivalent combination of the free acid and a basic reacting material, or a mixture of salt, acid and base, may be included. Also, a minor, effective amount of an alkali metal alginate may be included to advantage. A very small amount of an antifoam may be incorporated.

The foregoing composition is incorporated in water or an aqueous solution, such as a solution of water and a non-electrolyte freezing point depressant, for example, methanol, ethanol, ethylene glycol, glycerol, and the like. At least about 0.3 oz. of the composition, having reference only to the ingredients comprising the invention, is incorporated in each gallon of liquid. The composition is ordinarily added in an amount of about 0.3–3 oz. per gallon, or about 0.225–2.25% by weight of the liquid based on a liquid specific gravity of 1. Preferably at least 0.75 oz. per gallon is added, and at least 1.0 oz. per gallon is further preferred for best aluminum protection.

The preferred relative concentration ranges of the ingredients of the composition intended for addition to an aqueous liquid and the corresponding preferred concentration ranges in the resulting anti-corrosion solution, based on a liquid specific gravity of 1, are thus as follows:

| Compound | Conc'n. in composition, percent by weight | Conc'n. in liquid, percent by weight |
| --- | --- | --- |
| Mercaptobenzothiazole | 2–15 | 0.0045–0.34 |
| Sodium metasilicate pentahydrate | 4–15 | 0.009–0.34 |
| Sodium nitrite | 4–40 | 0.009–0.9 |
| Sodium nitrate | 4–40 | 0.009–0.9 |
| Sodium tetraborate pentahydrate | 10–85 | 0.02–1.9 |
| Base compound | 0.5–10 | 0.001–0.225 |
| Sodium alginate | 1–10 | 0.00225–0.225 |
| Antifoam | 0.03–0.1 | 0.0000675–0.00225 |

The values are based on the specific compounds listed and are adjusted correspondingly when other forms of the ingredients as regards the cations, anions, and amount of hydration are used. Thus, for example, if a potassium salt is employed instead of the sodium salt, a greater amount is used corresponding to the greater atomic weight of potassium: e. g., instead of 4% of sodium nitrite (M. W. 69), 4.9% of potassium nitrite (M. W. 85.1) is used to supply the same concentration of the nitrite anion. It will be apparent that greater concentrations may be employed in various applications; however, there ordinarily appears to be no need for more.

In evaluating the new corrosion inhibitor compositions, they were tested in most instances by two methods, referred to as A and B. Test method A represents a polymetallic electrically coupled system in contact with a type of water likely to be used in diesel engines. Test method B represents an idealized system in which the metals are not in contact and the water used is initially free of all dissolved solids.

TEST METHOD A

*Apparatus.*—The test was run in a wide mouth 1 liter flask, equipped with a reflux condenser and an aeration tube. The aeration tube was made of 2 mm. glass tubing, and was surrounded by a glass chimney to prevent impingement of the air on the specimens. The specimen assembly was supported in the solution by hooks of Nichrome wire. The flask was immersed in an oil bath at the desired temperature.

*Test solution.*—Test solutions were made up in a corrosion test water consisting of one part Chicago, Illinois, tap water to one part distilled water, with 10 grains of sodium chloride added per gallon. One liter of solution was used, and the temperature was maintained at 180° F.

*Specimens.*—The specimens used were picked for their similarity to metals used in diesel cooling systems. The specifications for each specimen, and the methods of preparation and cleaning were as follows:

(a) *Brass.*—The brass specimens consisted of a strip 1 in. by 1½ in. by 1/16 in., with a 9/64 in. mounting hole near one shorter edge. The composition is given by specification SAE 70 grade C. Preparation before testing was accomplished by polishing with No. 2/0 emery paper, and then washing with Bab-O cleanser. After the test, prior to reweighing, the specimen was cleaned with toluene, dipped in muriatic acid inhibited with 5% formaldehyde for 15 seconds, dipped in saturated sodium carbonate solution, and washed and dried. The average cleaning loss was 0.2 mg.

(b) *Copper.*—The copper specimen consisted of a strip 1 in. by 1½ in. by 1/16 in., conforming to specifications ASTM B133–47T. Preparation before testing and cleaning prior to reweighing was the same as for brass. The average cleaning loss was 0.3 mg.

(c) *Solder.*—The solder specimen consisted of a piece of either 8 or 10 B. & S. gage solid solder, having a surface area of 0.14 sq. dm. One end was flattened and a 5/32 in. mounting hole drilled. The composition of the solder was 30 percent tin and 70 percent lead, SAE grade 3A. The specimen was bent in the form of a loop. Before the test, the specimen was cleaned with toluene. After the test the specimen was washed with Bab-O. Average cleaning loss was 0.5 mg.

(d) *Aluminum.*—The aluminum specimens were of two types. In some tests they were made from cast strips of Alcoa 319 alloy. The specimens were milled to 1 in. by 1½ in. by 3/16 in., and polished with oiled No. 1/0 emery paper, degreased with toluene, and dried. They were mounted by means of a 9/64 in. hole near one edge.

In other tests the specimens were made from cast aluminum rod containing 5 percent silicon. The specimens were 5 in. long and 3/16 in. diameter and bent in the form of a loop. Before forming, the specimens were polished with No. 1/0 and 2/0 emery paper impregnated with paraffin.

After the test, both types of specimens were cleaned by immersion at 180° F. for 10 minutes in a solution containing 5 percent phosphoric acid and 2 percent chromic oxide by weight. Average cleaning loss was 0.2 mg.

(e) *Cast iron liner.*—The cast iron specimens were supplied by the American Locomotive Company, and were cut from a diesel cylinder liner. The specimens were approximately 1 in. by 2 in. by 3/8 in., with a 9/64 in. hole drilled near one shorter edge. If the inner wall was chrome-plated, the plating was removed by milling. The ferrous specimens were cleaned before and after a test by a 30 second immersion in inhibited muriatic acid, followed by a dip in saturated sodium carbonate solution, and then washed and dried.

*Procedure.*—After preparation, the specimens were weighed, and then mounted on a 6–32 brass screw, separated about 1/8 in. by conical brass washers, so that they were in electrical contact. The assembly was then placed in the test solution at 180° F. After one week, the specimens were removed, cleaned and reweighed, as described above. The extent of corrosion was determined by weight loss and/or visual examination.

TEST METHOD B

The apparatus was the same as used in Method A. The test solution was distilled water.

The specimens were brass, copper, aluminum and cast iron, as described Method A, and radiator tube. The latter specimen was a piece 1½ in. long cut from diesel radiator tubing made of brass (85% copper, 15% zinc) coated with tin. Cleaning procedures, before and after the test, were those described in Method A. The radiator tube was cleaned by the procedure used for solder in Method A.

The specimens were insulated from each other by suspending them on a glass rod with rubber spacers. The solutions were aerated at 180° F. for one week, removed, cleaned and reweighed. Corrosion was determined by weight loss and/or visual examination.

The following examples illustrate the invention, but it is to be understood that the invention is not limited thereto nor to the particular compositions, proportions and procedures therein, which are given only for purposes of illustration.

Example 1

A number of corrosion inhibitor compositions formulated in accordance with the invention were tested, and the results were compared with those obtained employing no inhibitor or compositions lacking one of the ingredients of the new inhibitor, including compositions previously suggested as corrosion inhibitors. Compositions tested are listed in Table I.

Test results are given in Table II. To aid in the interpretation of the test results, the following guide by McKay and Worthington, "Corrosion Resistance of Metals and Alloys," Reinhold Publishing Company, New York, 1936, page 102, is presented.

0–1 mdd [1] _____ No corrosion.
1–10 mdd _____ Very slight corrosion.
10–100 mdd _____ Intermediate corrosion.
Over 100 mdd _____ Serious corrosion.

[1] Milligrams per square decimeter per day.

Since some of the corrosion rates are reported in mils per year (mpy), the following charts give the relations between the two units for the various metals involved:

| mdd | Cast iron, mpy | Aluminum, mpy | Copper, mpy | Brass, mpy | Solder, mpy | Tin (radiator tube), mpy |
|---|---|---|---|---|---|---|
| 0–1 | 0–0.18 | 0–0.53 | 0–0.16 | 0–0.17 | 0–0.16 | 0–0.20 |
| 1–10 | 0.18–1.83 | 0.53–5.29 | 0.16–1.61 | 0.17–1.70 | 0.16–1.59 | 0.20–1.97 |
| 10–100 | 1.83–18.3 | 5.29–52.9 | 1.61–16.1 | 1.70–17.0 | 1.59–15.9 | 1.97–19.7 |
| Over 100 | Over 18.3 | Over 52.9 | Over 16.1 | Over 17.0 | Over 15.9 | Over 19.7 |

Such considerations as the nature of the attack, whether general or localized, the thickness of the metal concerned, and the type of part, whether of critical dimensions or not, all serve to modify the interpretation, so that the guide of McKay and Worthington is intended only as a very general one.

num when sodium metasilicate is omitted from the composition.

Test Nos. 10 and 11 illustrate the increased attack which occurs when sodium nitrate is omitted from the composition.

Test No. 12 shows that a combination of borax, mer-

TABLE I.—COMPOSITION INGREDIENTS, PERCENT BY WEIGHT

| Composition number | 1 | 2 | 3 | 4 | 5 | 6 | 7 | 8 | 9 | 10 | 11 | 12 | 13 |
|---|---|---|---|---|---|---|---|---|---|---|---|---|---|
| Sodium carbonate | 45.0 | | 50.9 | 49.1 | 49.3 | 36.0 | 48.0 | 39.0 | 41.1 | 57.1 | 47.0 | 5.4 | 7.4 |
| Sodium nitrite | 7.0 | 13.0 | 8.1 | 7.9 | 8.0 | 7.0 | 7.5 | 8.0 | | 8.6 | 7.5 | 5.0 | 5.0 |
| Sodium nitrate | 6.0 | 11.0 | 6.9 | 6.7 | 6.5 | 6.0 | | 6.5 | | | 6.5 | 6.5 | 6.5 |
| Sodium metasilicate, pentahydrate | 6.0 | 11.0 | 6.9 | 6.7 | 6.5 | | 6.5 | 6.5 | | | 6.5 | 6.5 | 6.5 |
| Mercaptobenzothiazole | 5.0 | 9.0 | 2.8 | 2.7 | 5.5 | 5.0 | 5.5 | 5.5 | 17.0 | 5.7 | | 5.5 | 5.5 |
| Boric acid (ortho-) | 21.0 | 12.0 | 24.4 | 23.6 | 23.5 | | 22.0 | 23.5 | | | 22.0 | | |
| Sodium metaborate, octahydrate ($Na_2B_2O_4 \cdot 8H_2O$) | | 44.0 | | | | | | | | | | | |
| Sodium tetraborate, decahydrate | | | | | | 36.0 | | | 41.9 | | | | |
| Sodium tetraborate, pentahydrate | | | | | | | | | | | | 70.4 | 63.4 |
| Alox 425 | 10.0 | | | 3.3 | | 10.0 | 10.5 | 11.0 | | 28.6 | 10.5 | | 5.0 |
| Antifoam [1] | | | | | 0.7 | | | | | | | 0.7 | 0.7 |

[1] 1 part Dow Corning Antifoam A and 19 parts sodium carbonate.

TABLE II.—METAL CORROSION

| Test number | 0 [1] | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Composition number | | 1 | 1 | 1 | 1 | 2 | 3 | 4 | 5 | 6 | 7 | 8 | 9 | 10 | 11 | 12 | 12 | 12 | 13 | 13 |
| Concentration, oz./gal | | 0.45 | 0.55 | 0.65 | 0.75 | 0.46 | 0.66 | 0.68 | 0.75 | 0.72 | 0.75 | 0.75 | 0.80 | 1.42 | 0.75 | 0.75 | 1.5 | 2.0 | 0.75 | 1.5 |
| Unit of measurement | mpy | mdd | mdd | mdd | mdd | mdd | mdd | mdd | mdd | mdd | mdd | mdd | mdd | mdd | mdd | mpy | mpy | mpy | mpy | mpy |

TEST METHOD A

| | | | | | | | | | | | | | | | | | | | | |
|---|---|---|---|---|---|---|---|---|---|---|---|---|---|---|---|---|---|---|---|---|
| pH | | | | | | 9.5 | | | | | | | | | | 9.2 | | | | |
| Cast iron liner | 18.6 | v.sl. | 0.0 | 0.0 | 0.0 | 0.0 | 0.0 | v.sl. | 0.0 | 0.0 | 0.0 | 0.0 | 0.0 | 2.4 | | 0.0 | 0.0 | 0.0 | 0.0 | 0.0 | 0.0 |
| Aluminum | 18.3 | 29.6 | 12.7 | 16.2 | 0.0 | 9.3 | 24.0 | 10.9 | 9.9 | 6.0 | 27.0 | 29.7 | 8.7 | | 7.9 | 31.0 | 5.9 | 0.6 | 9.9 | 1.9 | 1.0 |
| Solder | 0.6 | 3.8 | 3.8 | 4.2 | 3.9 | 1.4 | 2.9 | 3.2 | 2.3 | 8.4 | 5.4 | 5.5 | 12.4 | 17.4 | 2.5 | 0.6 | 0.6 | 0.0 | 0.3 | 0.8 |
| Copper | 0.3 | 0.0 | 0.0 | 0.0 | 0.0 | 0.0 | 0.0 | 0.0 | 0.0 | 0 | 1.6 | 12 | 0.8 | 0.5 | 3.2 | 1.7 | 0.2 | 0.3 | 0.2 | 0.1 | 0.1 |
| Brass | 0.3 | 0.0 | 0.0 | 0.0 | 0.0 | 0.0 | 0.0 | 0.0 | 0.0 | 0 | 1.1 | 0.8 | 0.5 | 0.8 | 1.8 | 1.5 | 0.1 | 0.1 | 0.1 | 0.0 | 0.1 |

TEST METHOD B

| | | | | | | | | | | | | | | | | | | | | |
|---|---|---|---|---|---|---|---|---|---|---|---|---|---|---|---|---|---|---|---|---|
| Cast iron liner | 10.2 | sl. | 0.0 | 0.0 | 0.0 | v.sl. | v.sl. | 0.0 | 0.0 | | | | | | | 0.0 | 0.0 | 0.0 | 0.0 | 0.0 |
| Aluminum | 7.8 | 19.3 | 19.6 | 11.4 | 2.6 | 4.4 | 2.0 | 5.2 | 5.1 | | | | | | | 0.3 | 0 | 1.7 | 1.2 | 0.3 |
| Copper | 0.7 | 0.0 | 0.0 | 0.0 | 0.0 | 0.0 | 0.0 | 0.0 | 0.0 | | | | | | | 0.3 | 0.2 | 0.2 | 0.1 | 0.3 |
| Brass | 0.7 | 0.0 | 0.0 | 0.0 | 0.0 | 0.0 | 0.0 | 0.0 | 0.0 | | | | | | | 0.1 | 0.1 | 0.1 | 0.1 | 0.1 |
| Radiator tube | 0.2 | 0.4 | 0.3 | 0.5 | 0.5 | 0.1 | 0.4 | 0.0 | 0.7 | | | | | | | 0.1 | 0.0 | 0.0 | 0.0 | 0.8 |
| pH | | | | | | | | | | | | | | | | 9.2 | | | | |

[1] No inhibitor present; sl.—slight corrosion; v.sl.—very slight corrosion.

The good protection afforded by two of the preferred compositions of relatively low nitrite and nitrate contents used at the preferred concentrations is illustrated by test Nos. 15 to 19 in Table II.

Test Nos. 1, 2, 3 and 4 illustrate the increased protection afforded aluminum when the concentration of a typical composition of the invention is increased from 0.45 oz./gal. to 0.75 oz./gal. Slight corrosion of cast iron becomes evident at the lower concentration.

Test No. 5 shows that a combination of different boron compounds can be used to provide the proper alkalinity and illustrates that additional basic reacting material is not required.

Test No. 6 illustrates the finding that less than about 5 percent mercaptobenzothiazole in the composition permits attack on cast iron. Comparison of this result with that of test No. 7 shows that this deficiency is overcome by the use of Alox 425 with the lesser amount of mercaptobenzothiazole. Test No. 8 illustrates the finding that the minimum effective percentage of mercaptobenzothiazole in the absence of Alox 425 appears to be about 5 percent.

Test No. 9 illustrates the high corrosion rate of alumicaptobenzothiazole and sodium carbonate does not protect solder adequately.

Test No. 13 shows failure to protect solder adequately when a combination of mercaptobenzothiazole, sodium carbonate, sodium nitrite and a large proportion of Alox 425, containing organic acids, is employed.

Test No. 14 shows that an absence of mercaptobenzothiazole results in corrosion of aluminum.

*Example 2*

Tests were carried out by method B, except that the duration of the test was three days instead of seven. Copper and brass were tested in one flask, solder and tin in another, aluminum in a third, and cast iron in a fourth. The test results are given in Table III.

For these tests, the sodium salts of Alox 425 and mercaptobenzothiazole were prepared by neutralization with excess caustic followed by adjustment of pH to 9–9.5 through the use of a sulfonated polystyrene-divinylbenzene cation exchange resin in the hydrogen form. The sodium salt of mercaptobenzothiazole also was prepared through combination of mercaptobenzothiazole with 20 percent excess sodium carbonate.

TABLE III

| Composition (concentration, 0.5 oz./gal.) | pH | | Corrosion rate, mdd | | | | | |
|---|---|---|---|---|---|---|---|---|
| | Initial | Final | Copper | Brass | Solder | Tin [1] | Aluminum | Cast Iron |
| Blank | | | 7.8 | 6.8 | 1.2 | 0.0 | 10.1 | 89.0 |
| Sodium tetraborate decahydrate | | | 4.2 | 1.3 | 1.2 | 0.3 | 185 | 0.7 |
| Sodium nitrite | | | 11.2 | 2.6 | 15.2 | 0.0 | 13.3 | 2.7 |
| Sodium nitrate | | | 5.1 | 3.0 | 28.0 | 0.5 | 21.4 | 100 |
| Sodium metasilicate pentahydrate | | 11.8 | 3.0 | 6.1 | 81.2 | 16.5 | 9.8 | 3.4 |
| Mercaptobenzothiazole plus sodium carbonate | | 10.1 | 0.0 | 0.0 | 27.7 | 26.7 | 416 | 3.3 |
| Mercaptobenzothiazole, sodium salt | 9.3 | 8.5 | 1.6 | 0.0 | 0.0 | 0.0 | 15.8 | 7.7 |
| Alox 425, sodium salt | 9.1 | 8.7 | 7.0 | 6.6 | 116 | 0.0 | 12.9 | 81.0 |

[1] As described in Example 4.

These results show that no single ingredient provides satisfactory corrosion protection for all metals and that some greatly increase the corrosion rate. The situation is complicated in practice by the fact that metals are coupled to each other, and this usually aggravates the corrosion problem.

*Example 3*

Corrosion inhibitor composition No. 5 (Table I) was tested comparatively with a sodium chromate inhibitor which is used extensively in diesel engine cooling systems. The test methods were A and B, and method C, as follows:

TEST METHOD C

A recirculating test was designed to more nearly duplicate actual conditions in a diesel cooling system and give a final laboratory evaluation of a treatment. Water was circulated by means of a centrifugal pump from a 5 gal. glass reservoir through 50 feet of ¼ in. copper tubing, then through a 3-foot length of 9/16 in., 20 gauge, cold drawn seamless steel tubing, and back to the reservoir. The steel tube was heated by means of several bunsen burners to maintain an effluent temperature of 180° F., thus providing a heat transfer surface. The copper tubing coil served to radiate heat. Flow through the system was approximately 0.4 gal./min. The copper coil and the steel tube were in electrical contact.

Specimens of the type used in Method A were suspended in the reservoir, in contact, as described in that method. The test solution and cleaning procedures were those of method A. After the test, which lasted one week, the specimens were cleaned and reweighed to determine weight loss. Corrosion and scale formation were determined at the heat transfer surfaces by cutting the tube on a diagonal, and observing that part of the tube which was directed over the flame.

The test results are given in Table IV. In these tests, there was no indication of pitting attack of any of the metals nor that a scale problem would be presented. Protection of aluminum was considerably better with the new inhibitor than with the chromate inhibitor, and the new inhibitor otherwise compared very favorably.

Composition No. 5 and the chromate inhibitor were also compared in their effects on rubber hose, immersed in the foregoing test solutions.

The rubber specimens were prepared by stripping the inner rubber layer from a piece of radiator hose from a diesel engine. A piece about 1 in. by 2 in. was immersed in one liter of the aerated test solution at 180° F. for four weeks. The volume of the hose was measured before and after the test by weighing in water, drying the surface with a cloth, and weighing in air. The percent swelling was calculated, and the specimen examined for signs for deterioration.

Neither solution showed any effect on the hose.

Harmful effects on lubricating oils have reportedly resulted from contamination with water containing a chromate inhibitor. Accelerated tests at high temperatures under oxidizing conditions did not indicate any breakdown or sludging of three different lubricating oils in contact with a solution of water and 0.75 oz./gal. of the new composition.

*Example 4*

Composition No. 1 (Table I) was tested for effectiveness when employed in an ethylene glycol solution. The test methods were A and B, except that the respective solutions included 40% ethylene glycol and instead of radiator tube, a tin specimen was used. The tin specimen was 1 in. by 1½ in. by 20 B. and S. gauge, with a 5/32 in. mounting hole drilled near one shorter edge, and it was cleaned by washing with Bab-O before and after the test.

The test results are given in Table V. The results showed that the inhibitor was effective in the glycol solution and gave better protection to aluminum than the chromate inhibitor did in water containing no glycol.

TABLE V

| Test method | Metal corrosion, mdd | |
|---|---|---|
| | A | B |
| Concentration, oz./gal | 0.75 | 0.75 |
| Copper | 0.1 | 0.6 |
| Brass | 0.6 | 0.7 |
| Solder | 1.3 | |
| Tin | | 0.0 |
| Aluminum | 36.2 | 0.0 |
| Cast iron liner | 0.0 | 0.0 |

TABLE IV

| Test method | A | | B | | C | |
|---|---|---|---|---|---|---|
| Composition | No. 5 | Chromate | No. 5 | Chromate | No. 5 | Chromate |
| Copper | 1.4 | 0.4 | 1.9 | 2.6 | 1.3 | 2.2 |
| Brass | 0.9 | 0.1 | 0.9 | 0.8 | 0.8 | 1.1 |
| Aluminum | 10.3 | 72.5 | 7.4 | 50.4 | 10.4 | 47.2 |
| Solder | 2.3 | 0.3 | | | 3.3 | 4.8 |
| Cast iron liner | 0 | 0 | 0 | 0 | 0 | 0 |
| Radiator tube | | | 0.3 | 0.2 | | |

Solution pH values: No. 5, 9.2 to 9.4; chromate, 9.1 to 9.3. Concentration, oz./gal. of test solution: No. 5, 0.75; chromate, 0.4 (standard concentration for ordinary applications).

Example 5

The following composition was tested for corrosion inhibition, employing Test Methods A and B:

| | Percent |
|---|---|
| Sodium carbonate | 5.4 |
| Sodium tetraborate, pentahydrate | 65.4 |
| Sodium metasilicate, pentahydrate | 6.5 |
| Sodium nitrite | 5.0 |
| Sodium nitrate | 6.5 |
| Mercaptobenzothiazole | 5.5 |
| Antifoam [1] | 0.7 |
| Sodium alginate | 5.0 |

[1] Same as in Table I.

The test results are given in Table VI. The tests showed that the inhibitor furnishes excellent protection to aluminum and cast iron, while being otherwise effective.

TABLE VI

| Test method | Metal corrosion, mpy | | | |
|---|---|---|---|---|
| | A | A | B | B |
| Concentration, oz./gal | 0.3 | 0.75 | 0.3 | 0.75 |
| Aluminum | 25.0 | 2.5 | 13.4 | 0.6 |
| Copper | 0.2 | 0.2 | 0.3 | 0.3 |
| Brass | 0.3 | 0.2 | 0.3 | 0.2 |
| Solder | 0.9 | 2.6 | | |
| Radiator tube | | | 0.1 | 0.1 |
| Cast iron liner | 0.0 | 0.0 | 0.0 | 0.0 |

Solution pH: 9.2 in each test.

Example 6

Corrosion inhibitor composition No. 1 (Table I) was tested on a number of subjects for effects in normal handling. In the tests, 40 individuals, 28 males and 12 females, were used as test subjects. They were divided into two groups of twenty. One group was used to test the effect of a solution of composition No. 1 containing 0.75 oz./gal. The other group was used to test the effect of dry powdered No. 1. The test material in both forms was applied to the flexor surfaces of the forearm. A gauze patch containing the material was applied and held in place with adhesive tape for varying lengths of time. When the solution was used the time of contact was maintained for ½, 1, 4, 8 and 24 hours. The dry material was in contact with the human skin for 8 hours per day for 5 successive days.

Observations were made for signs of erythema, edema or vesicles at the time of the removal of the patch and for five days thereafter. Where possible, a second application of the test material was made ten days after the initial contact to aid in the evaluation of reactions of sensitization which may have occurred. The conclusions of these tests were:

(1) Human subjects after skin contact with a 0.75 oz./gal. solution for continuous periods up to 24 hours showed no skin reactions.

(2) Human subjects after skin contact with powdered material for 8-hour periods on five successive days showed no skin reactions.

(3) The results indicated that the inhibitor has a very low order of activity as a primary skin irritant or sensitizer.

Example 7

Service tests were carried out in diesel electric locomotive cooling systems, the tests running for a number of months. Composition No. 1 (Table I) was added to the cooling water, in a concentration of 0.75 oz./gal.

Inspections made at periodic intervals showed that excellent results were obtained. All water passages in cylinder heads and liners as well as all lines visible on removal of water pumps showed no corrosion or deposits.

Excellent results were obtained on the aluminum headers, with an actual control of further corrosion at points which had shown previous attack on the suction side of the impeller vanes. There were no deposits, general or pitting corrosion on the sides and other parts of the units.

Example 8

Corrosion inhibitor compositions according to the invention were tested as described in Example 1. The compositions are listed in Table VII, and the test results are given in Table VIII.

Test Nos. 20 to 24 demonstrate the improved protection afforded by preferred high nitrite-high nitrate compositions over a range of concentrations.

Test No. 25 demonstrates the use of a composition having both very high nitrite and very high nitrate contents.

Test Nos. 26 and 27 demonstrate the efficacy of compositions having high silicate contents, and having high nitrite and nitrate contents, with the nitrate preponderating.

TABLE VII.—COMPOSITION INGREDIENTS, PERCENT BY WEIGHT

| Composition number | 14 | 15 | 16 | 17 | 18 |
|---|---|---|---|---|---|
| Sodium nitrite | 20.0 | 20.0 | 37.0 | 20.0 | 20.0 |
| Sodium nitrate | 20.0 | 20.0 | 37.0 | 40.0 | 40.0 |
| Sodium metasilicate, pentahydrate | 6.3 | 6.3 | 6.0 | 10.0 | 8.0 |
| Mercaptobenzothiazole | 6.0 | 6.0 | 6.0 | 6.0 | 6.0 |
| Sodium metaborate octahydrate ($Na_2B_2O_4 \cdot 8H_2O$) | | 25.0 | | 24.0 | 12.3 |
| Sodium tetraborate, pentahydrate | 47.0 | 22.0 | 14.0 | | 13.0 |
| Antifoam [1] | 0.7 | 0.7 | | | 0.7 |

[1] Same as in Table I.

TABLE VIII.—METAL CORROSION, MPY

| Test number | 20 | 21 | 22 [2] | 23 | 24 | 25 | 26 | 27 |
|---|---|---|---|---|---|---|---|---|
| Composition number | 14 | 15 | 15 | 15 | 15 | 16 | 17 | 18 |
| Concentration, oz./gal | 0.75 | 0.75 | 0.75 | 0.3 | 1.5 | 0.75 | 0.75 | 0.75 |

TEST METHOD A

| | | | | | | | | |
|---|---|---|---|---|---|---|---|---|
| pH [1] | 8.8 | 9.6–9.1 | 9.4–9.2 | 9.1 | 9.2 | 8.8 | 9.5 | 9.2 |
| Cast iron liner | 0.5 | 0.4 | 0.2 | 0.3 | 0.4 | 0.8 | 0.2 | 0.5 |
| Aluminum | 1.9 | 5.1 | 2.3 | 9.7 | 4.1 | 4.2 | 1.0 | 6.2 |
| Solder | 0.5 | 1.0 | 1.0 | + | 0.2 | 4.1 | 1.8 | 0.7 |
| Copper | 0.5 | 0.3 | 0.1 | 0.3 | 0.3 | 0.2 | 0.4 | 0.4 |
| Brass | 0.3 | 0.0 | 0.1 | 0.3 | 0.3 | 0.3 | 0.4 | 0.3 |

TEST METHOD B

| | | | | | | | | |
|---|---|---|---|---|---|---|---|---|
| pH | 8.8 | 9.4–9.2 | 9.4–9.2 | 9.1 | 9.5 | | 9.4 | |
| Cast iron liner | 0.4 | 0.4 | 0.1 | 0.4 | 0.4 | | 0.5 | |
| Aluminum | 0.5 | 0.9 | 0.2 | 13.2 | 0.8 | | 0.9 | |
| Copper | 0.7 | 0.5 | 0.1 | 0.3 | 0.5 | | 0.6 | |
| Brass | 0.2 | 0.0 | 0.1 | 0.3 | 0.4 | | 0.3 | |
| Radiator tube | 0.0 | 0.1 | 0.0 | 0.1 | 0.2 | | 0.3 | |

[1] pH values remained about same during tests unless otherwise indicated.
[2] 30-day test.
+ indicates weight increase.

No foaming problem has been encountered in using the new composition containing antifoam, as described; and in particular, no significant foaming takes place in the presence of a small amount of oil, such as may leak into the cooling system from time to time.

Many diesel engine locomotive units have been undergoing tests with the new composition, the units representing most of the various designs now in use on the railroads. Very favorable results have been reported by the users.

There is thus provided by the invention new compositions and methods very effective in the inhibition of corrosion in diesel engine cooling systems, and particularly, in the corrosion of aluminum therein. The compositions are compatible with anti-freeze solutions. They produce no harmful effects on the various non-metals present in cooling systems. No harmful effects on personnel have been encountered in industrial use.

The compositions present no scale or sludge problem. They are stable in storage and in continued use in cooling systems. They are very adaptable to the different conditions encountered, economical and readily available, and methods of control are simple.

The invention is hereby claimed as follows:

1. A corrosion inhibitor composition for aqueous liquids comprising in percentages by weight a corrosion inhibiting amount up to about 15% of a compound selected from the group consisting of mercaptobenzothiazole and alkali metal salts thereof, about 4–15% of an alkali metal silicate calculated as the metasilicate pentahydrate, about 4–40% of an alkali metal nitrite, about 4–40% of an alkali metal nitrate, about 10–85% of a compound selected from the group consisting of boric acid and alkali metal borates, the latter being calculated as the tetraborate pentahydrate, and an amount of a base selected from the group consisting of the alkali metal hydroxides, carbonates and bicarbonates sufficient to provide a pH of about 8.5–10 in an aqueous solution of said composition.

2. A corrosion inhibitor composition for aqueous liquids comprising in percentages by weight about 2–15% of a compound selected from the group consisting of mercaptobenzothiazole and alkali metal salts thereof, about 4–15% of an alkali metal silicate calculated as the metasilicate pentahydrate, about 4–40% of an alkali metal nitrite, about 4–40% of an alkali metal nitrate, about 1–10% of an alkali metal alginate, about 10–85% of a compound selected from the group consisting of boric acid and alkali metal borates, the latter being calculated as the tetraborate pentahydrate, and an amount of a base selected from the group consisting of the alkali metal hydroxides, carbonates and bicarbonates sufficient to provide a pH of about 8.5–10 in an aqueous solution of said composition.

3. A corrosion inhibitor composition for aqueous liquids comprising in percentages by weight about 2–15% of a compound selected from the group consisting of mercaptobenzothiazole and alkali metal salts thereof, about 4–15% of an alkali metal silicate calculated as the metasilicate pentahydrate, about 4–40% of an alkali metal nitrite, about 4–40% of an alkali metal nitrate, about 10–85% of a compound selected from the group consisting of boric acid and alkali metal borates, the latter being calculated as the tetraborate pentahydrate, and an amount of a base selected from the group consisting of the alkali metal hydroxides, carbonates and bicarbonates sufficient to provide a pH of about 8.5–10 in an aqueous solution of said composition.

4. A cooling solution for internal combustion engines consisting of water and a corrosion inhibitor composition comprising in percentages by weight about 0.0045–0.34% of an alkali metal salt of mercaptobenzothiazole, about 0.009–0.34% of an alkali metal silicate calculated as the metasilicate pentahydrate, about 0.009–0.9% of an alkali metal nitrite, about 0.009–0.9% of an alkali metal nitrate and about 0.02–1.9% of an alkali metal borate calculated as the tetraborate pentahydrate, all said percentages by weight being based on the weight of the cooling solution, and said solution being at a pH of about 8.5–10.

5. A cooling solution for internal combustion engines consisting of water and a corrosion inhibitor composition comprising in percentages by weight about 0.0045–0.34% of an alkali metal salt of mercaptobenzothiazole, about 0.009–0.34% of an alkali metal silicate calculated as the metasilicate pentahydrate, about 0.009–0.9% of an alkali metal nitrite, about 0.009–0.9% of an alkali metal nitrate and about 0.02–1.9% of an alkali metal borate calculated as the tetraborate pentahydrate, all said percentages by weight being based on the weight of the cooling solution, and an amount of a base selected from the group consisting of the alkali metal hydroxides, carbonates and bicarbonates sufficient to provide a pH of about 8.5–10 in said solution.

6. An anti-freeze cooling solution for internal combustion engines consisting of water, ethylene glycol, and a corrosion inhibitor composition comprising in percentages by weight about 0.0045–0.34% of an alkali metal salt of mercaptobenzothiazole, about 0.009–0.34% of an alkali metal silicate calculated as the metasilicate pentahydrate, about 0.009–0.9% of an alkali metal nitrite, about 0.009–0.9% of an alkali metal nitrate and about 0.02–1.9% of an alkali metal borate calculated as the tetraborate pentahydrate, all said percentages by weight being based on the weight of the cooling solution, and said solution being at a pH of about 8.5–10.

7. A corrosion inhibitor composition for aqueous liquids comprising in percentages by weight a corrosion inhibiting amount up to about 15% of a compound selected from the group consisting of mercaptobenzothiazole and alkali metal salts thereof, about 4–15% of an alkali metal silicate calculated as the metasilicate pentahydrate, about 20–40% of an alkali metal nitrite, about 20–40% of an alkali metal nitrate, and about 10–85% of a compound selected from the group consisting of boric acid and alkali metal borates, the latter being calculated at the tetraborate pentahydrate.

8. A corrosion inhibitor composition for aqueous liquids comprising the following materials, in about the respective parts by weight:

5 parts of mercaptobenzothiazole
6 parts of sodium metasilicate pentahydrate
7 parts of sodium nitrite
6 parts of sodium nitrate
21 parts of boric acid
45 parts of sodium carbonate 9. A corrosion inhibitor composition for aqueous liquids comprising the following materials, in about the respective parts by weight:

6 parts of mercaptobenzothiazole
6.3 parts of sodium metasilicate pentahydrate
20 parts of sodium nitrite
20 parts of sodium nitrate
47 parts of sodium tetraborate pentahydrate References Cited in the file of this patent

UNITED STATES PATENTS

| | | |
|---|---|---|
| 2,153,952 | Bayes | Apr. 11, 1939 |
| 2,172,075 | Whaley | Sept. 5, 1939 |
| 2,264,389 | Lamprey | Dec. 2, 1941 |
| 2,349,338 | Clapsadle et al. | May 23, 1944 |
| 2,373,570 | Keller | Apr. 10, 1945 |
| 2,411,676 | Burghart | Nov. 26, 1946 |
| 2,534,030 | Keller | Dec. 12, 1950 |

U. S. DEPARTMENT OF COMMERCE
PATENT OFFICE

CERTIFICATE OF CORRECTION

Patent No. 2,815,328

December 3, 1957

Jerome Green et al.

It is hereby certified that error appears in the printed specification of the above numbered patent requiring correction and that the said Letters Patent should read as corrected below.

Column 1, lines 23 and 24, for the date "August 21, 1853" read -- August 21, 1953 --; column 3, line 4, for "case" read -- ease --; column 8, line 27, after "described" insert -- in --; columns 9 and 10, Table II, under the heading "TEST METHOD A", eleventh column thereof, second item, for "27.0" read -- 270 --; column 11, line 55, for "directed" read -- directly --; column 13, line 41, for "surfaces" read -- surface --; column 16, line 41, for "calculated at" read -- calculated as --.

Signed and sealed this 20th day of May 1958.

(SEAL)

Attest:

KARL H. AXLINE

Attesting Officer

ROBERT C. WATSON
Commissioner of Patents